F. A. ANDERSON.
SCREW DRIVER.
APPLICATION FILED DEC. 3, 1920.
1,404,562.
Patented Jan. 24, 1922.
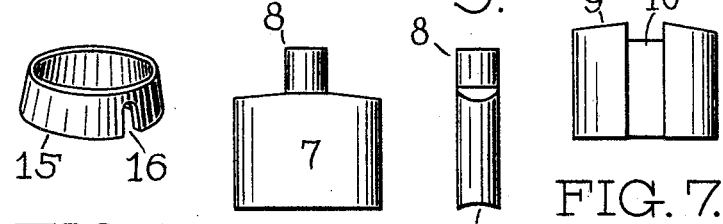
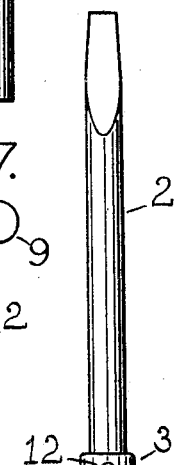
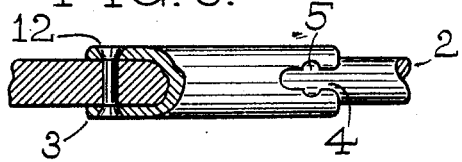
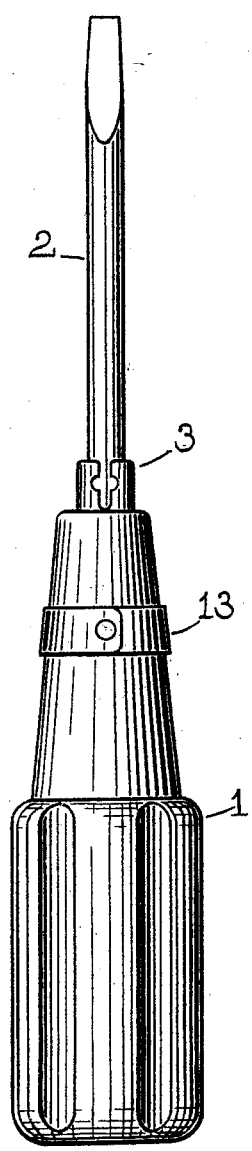
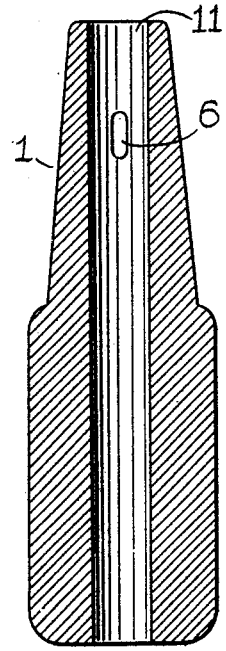
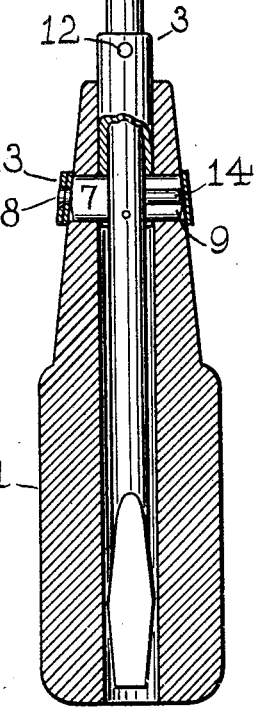
Fritz Alfred Anderson,
Inventor
By Frank Carlson
His Attorney.

UNITED STATES PATENT OFFICE.

FRITZ ALFRED ANDERSON, OF NEW YORK, N. Y.

SCREW DRIVER.

1,404,562.     Specification of Letters Patent.    Patented Jan. 24, 1922.

Application filed December 3, 1920. Serial No. 428,011.

*To all whom it may concern:*

Be it known that I, FRITZ ALFRED ANDERSON, a citizen of the United States, and a resident of the borough of Manhattan, in the county of New York and State of New York, have invented certain new and useful Improvements in Screw Drivers, of which the following is a specification.

This invention relates to screw-drivers, and especially to that class of the same wherein a screw engaging blade is provided upon its shank with an annular sleeve adapted to engage the hollow portion of a handle.

The main object of my invention is to introduce new securing means in the mentioned handle to facilitate disengagement of the screw engaging blade from said handle, and yet, in operative position hold said parts rigid.

Further objects and resulting advantages will become apparent as the specification proceeds.

The invention consists in certain novel features and arrangements of parts by which said objects are attained and are presently to be described in the specification and claims.

The accompanying drawing forms a part of this specification and illustrates an approved form of my invention.

Fig. 1 is a view of a tool embodying my invention.

Fig. 2 is another view of the same with some parts in section to disclose the interior structure.

Fig. 3 is a view of a substitute part for part 13 in the previous figures.

Fig. 4 is a magnified view of part 7 of Fig. 2.

Fig. 5 is an end view of Fig. 4.

Fig. 6 is a view of part 9 of Fig. 2.

Fig. 7 is a top view of Fig. 6.

Fig. 8 is a magnified portion of parts 2 and 3 of Fig. 1 in partial section.

Fig. 9 is a longitudinal section of part 1 of Fig. 1.

Fig. 10 is a view of part 14 of Fig. 2.

Throughout the views, like reference numerals refer to the same parts.

The handle body 1 is made of metal, preferably die casting, and has a central hole 11 running longitudinally through the same. The double bladed shank 2 is provided at its middle portion with a sleeve 3 which is fitted very tightly on the shank, and is of such external diameter that it will fit accurately into bore 11 of the handle body.

It is, of course, obvious that the shank 2 may have either of its different screw engaging blades exposed and yet a similar relation will exist between sleeve 3 and the hole in handle 1.

However, whether the larger or the smaller blade of the shank is presented, it is necessary to ensure the blade's turning with the handle in use, and prevent the sleeve from sliding too far into the handle. For this purpose a pair of corresponding transverse slots have been provided in handle body 1 similar to 6 in Fig. 9. Furthermore, a pair of corresponding slots have been cut in both ends of sleeve 3 similar to 4 in Fig. 8, a pin 12 being riveted through the pair of resulting tongues at each end and through the shank 2, the object of the pin being mainly to locate the sleeve.

If a flat piece 7 is now introduced into slot 6 and the shank 2 with its sleeve 3 passed into the bore of the handle, the sides and one end of piece 7 will engage the parallel sides of slot 4, and prevent the sleeve and shank from turning, while the said parts will also be prevented from inward travel as the inner end of the slot engages the end of the piece. However, means must now be added to prevent the blades from dropping out in case the tool should be inverted. This is effectively accomplished by providing a second piece 9 with a reduced portion 10, and, after having fixed said piece in the handle opposite piece 7, by further introducing a hairpin spring made of half round stock into the handle so that it straddles the reduced portion of piece 9.

It will then be seen that as the spring tends to open, its inner extremities will engage the widened parts 5 of slot 4 in the sleeve, and will require a certain amount of force to release the sleeve and shank as its resistance to being squeezed together in order to pass the narrower part of slot 4 must be overcome first.

Naturally, all four of the slots in sleeve 3 have corresponding widened sections similar to 5, so that the shank may be thrust into the handle from either end—and either side.

The inner faces of pieces 7 and 9 have been made with a curvature as shown in Fig. 5 to correspond with the surface of shank 2, so that maximum bearing surface upon the sides of the lower extremities of the pieces will result.

Although the wedges are intended to be driven into their respective slots, they may work loose and drop out and be lost, and a band 13 provided with perforated ends has therefor been secured about handle 1 by passing the extremities over the round end 8 of piece 7 and riveting the latter down on the band. Another form of band is shown at 15, where a slot 16 permits the band to be forced on the handle till the slot engages the mentioned head 8, when the latter may be riveted as before, even a wire might serve the same purpose.

Of course, the handle body could be made as a unitary die casting and could be cast about the pieces to secure the latter in permanent positions. I desire to reserve all rights to any such modifications within the spirit of my invention.

Having thus fully described my invention, I claim:

1. In a tool of the character described having a hollow handle adapted to receive a blade shank provided with a sleeve and a radial plug adapted to project inwardly from said handle into a slot in said sleeve, a spring located in a slot in said plug likewise projecting radially through said handle into a notch in the slot in said sleeve, said spring and notch being adapted to act as a lock in combination with said plug for said tool shank and sleeve in said handle.

2. In a tool having a handle adapted to receive a blade shank and provided with a radial plug projecting through the wall of said handle into an open slot in said shank, a bifurcated spring located in a slot in said plug, straddling the said plug and likewise projecting radially with both legs through the wall of said handle into a pair of opposite notches in the sides of said open slot.

Signed at 132 Nassau Street, in the borough of Manhattan, in the county of New York, city and State of New York, this 1st day of December 1920.

FRITZ ALFRED ANDERSON.

Witnesses:
C. A. KARLSON,
G. BORGFELDT.